United States Patent
Gupta et al.

(10) Patent No.: US 12,519,880 B2
(45) Date of Patent: Jan. 6, 2026

(54) METHODS AND SYSTEMS FOR AMENDING SENT TEXT-BASED MESSAGES

(71) Applicant: Adeia Guides Inc., San Jose, CA (US)

(72) Inventors: Vikram Makam Gupta, Karnataka (IN); Rupayan Dutta, West Bengal (IN); Vishwas Sharadanagar Panchaksharaiah, Karnataka (IN); Sukanya Agarwal, Panchkula Haryana (IN); Reda Harb, Issaquah, WA (US)

(73) Assignee: Adeia Guides Inc., San Jose, CA (US)

( * ) Notice: Subject to any disclaimer, the term of this patent is extended or adjusted under 35 U.S.C. 154(b) by 404 days.

(21) Appl. No.: 18/087,534

(22) Filed: Dec. 22, 2022

(65) Prior Publication Data

US 2024/0214484 A1    Jun. 27, 2024

(51) Int. Cl.
  *H04M 1/72436*    (2021.01)
  *H04L 51/224*     (2022.01)

(52) U.S. Cl.
  CPC ...... *H04M 1/72436* (2021.01); *H04L 51/224* (2022.05)

(58) Field of Classification Search
  CPC . H04M 1/72436; H04L 51/224; H04L 51/063
  See application file for complete search history.

(56) References Cited

U.S. PATENT DOCUMENTS

| | | | |
|---|---|---|---|
| 7,761,892 B2 | 7/2010 | Ellis et al. | |
| 8,046,801 B2 | 10/2011 | Ellis et al. | |
| 8,880,529 B2 | 11/2014 | Klar et al. | |
| 11,221,751 B2 | 1/2022 | Chaudhri et al. | |
| 2005/0251827 A1 | 11/2005 | Ellis et al. | |
| 2007/0124387 A1* | 5/2007 | Galloway | H04L 51/063 709/206 |
| 2013/0060560 A1* | 3/2013 | Mahkovec | G06F 40/232 704/9 |
| 2016/0173426 A1* | 6/2016 | Chan | H04L 51/046 709/206 |
| 2017/0228363 A1* | 8/2017 | Takahashi | G06F 1/163 |
| 2019/0081914 A1* | 3/2019 | Chang | G06F 40/30 |

* cited by examiner

*Primary Examiner* — Farid Seyedvosoghi
(74) *Attorney, Agent, or Firm* — HALEY GUILIANO LLP

(57) ABSTRACT

A computer-implemented method and a system are provided for amending sent text-based messages. One example computer-implemented method includes obtaining, from a source, a text-based message and receiving, at a user device, an inquiry of a portion of the text-based message. The computer-implemented method further includes requesting, from a network, data based on the inquiry of the portion of the text-based message, amending at least the portion of the text-based message based on the data, and presenting the amended portion of the text-based message at the user device.

20 Claims, 8 Drawing Sheets

METHODS AND SYSTEMS FOR AMENDING SENT TEXT-BASED MESSAGES

BACKGROUND

The present disclosure relates to a computer-implemented method and a system for receiving a request for data based on an inquiry of a portion of a text-based message, for amending at least a portion of the text-based message based on the requested data, and for presenting an amended portion of the text-based message at a user device.

SUMMARY

Users of user devices utilize text-based messaging apps (for example, WeChat, WhatsApp, iMessage, etc.) for all sort of purposes. It is normal for two users to text each other back and forth on their respective user devices instead of having a phone call or video call, since having a phone call or video call might be inconvenient (for example, one of them is at work or simply does not want to talk over the phone). Similarly, it is common for a group of users, each of which comprising at least one user device to be part of the same group so that they can all text each other with the use of their respective user devices.

Commercial tools that are currently available for amending/editing sent text-based messages lack desired features that makes the process efficient for the user and for the infrastructure that power the messaging service (for example, servers). While allowing users to edit already sent text messages is a convenient way to correct errors such as misspellings, it can also lead to confusion. For example, a recipient that already exchanged tens of messages during a short period of time with a sender, might be confused if the sender decides to edit a text-based message that was sent way back when the conversation started. Therefore, there is a need to streamline the 'sent-message' editing feature to account for context.

A computer-implemented method and a system are described below for receiving a request for data based on an inquiry of a portion of a text-based message, for amending at least a portion of the text-based message based on the requested data, and for presenting an amended portion of the text-based message at a user device.

In some embodiments, a computer-implemented method is provided in which a text-based message is obtained (for example, at a user device) from a source (for example, a communications network which is in communication with another user device). The computer-implemented method further provides receiving, at the user device, an inquiry (for example, a user input at the user device) of a portion of the text-based message (for example, a character, a word, a set of characters, a set of words, or a combination thereof). The computer-implemented method further provides requesting, from a network (for example, the communications network which is in communication with a plurality of servers and with a plurality of other user device), data based on the inquiry of the portion of the text-based message. The computer-implemented method further provides amending at least the portion of the text-based message based on the data, and presenting the amended portion of the text-based message at the user device.

In some embodiments, the computer implemented method is provided to further comprise presenting a notification (for example, an audiovisual notification presented at a graphical user interface (GUI) at a user device of a sender and/or an audiovisual notification presented at a GUI at a user device of the receiver) that the text-based message was amended. The notification can comprise any one of presenting at least the portion of the amended text-based message in a different visual format to the text-based message, presenting at least the portion of the amended text-based message in addition to the text-based message, and playing back an audio recording of at least the portion of the amended text-based message.

In some embodiments, the inquiry of the portion of the text-based message can comprise any one of a misspelling of at least one word, a correct spelling of at least one word where the meaning of the word is not known to a user of the user device, and a set of words comprising at least one word that is syntactically different to the remaining words of the set of words.

In some embodiments, requesting, from the network, data based on the inquiry of the portion of the text-based message can further comprise parsing the portion of the text-based message through any one of a visual and/or textual based autocorrection program, a dictionary program, a thesaurus program, and a translation program. The computer-implemented method can subsequently be provided to select, based on the parsing, at least one replacement word or character for the portion of the text-based message. In some embodiments, parsing the portion of the text-based message further comprises extracting tokens from the text-based message (for example, splitting the string/sentence to extract tokens from the string). Parsing the portion of the text-based message further comprises performing syntactic analysis on the tokens (for example, to check whether a word belongs to a particular language's grammar) and performing semantic analysis on the tokens (for example, defining a word).

In some embodiments, presenting the amended text-based message at the user device can further comprise presenting, at the user device, an option to accept or reject the presented amended text-based message, requesting, from the source, additional data if the presented amended text-based message was rejected; and subsequent to receiving additional data from the source, presenting a further amended text-based message at the user device, wherein the source is the sender of the text-based message. The computer-implemented method may further comprise automatically generating and sending, at the user device, a notification to the source if the presented amended text-based message was accepted.

In some embodiments, the computer implemented method is provided to further comprise providing, at the user device, a visual notification that data related to at least the portion of the text-based message is available, providing, at the user device, an option to select the visual notification, and subsequent to receiving a selection at the user device, presenting at least some of the data based on the portion of the text-based message at the user device.

In some embodiments, the computer implemented method is provided to further comprise storing the amended portion of the text-based message, receiving at least one further text-based message, the at least one further text-based message comprising the same portion, and automatically amending the portion of the at least one further text-based message based on the stored amended portion of the text-based message.

In some embodiments, at least a portion of the text-based message comprises any one of a word, an alphanumeric character, a special character, an image, or any combination of the above.

In some embodiments, a system comprising a memory storing instructions, communication paths, and control circuitry coupled to the communication paths and the memory is provided. The control circuitry coupled to the communication paths and the memory is configured to execute instructions to obtain a text-based message (for example, at a user device) from a source (for example, a communications network which is in communication with another user device). The control circuitry is further configured to receive, at the user device, an inquiry (for example, a user input at the user device) of a portion of the text-based message (for example, a character, a word, a set of characters, a set of words, or a combination thereof). The control circuitry is further operable to request, from a network (for example, the communications network which is in communication with a plurality of servers and with a plurality of other user device), data based on the inquiry of the portion of the text-based message. The control circuitry is further operable to amend at least the portion of the text-based message based on the data, and present the amended portion of the text-based message at the user device.

It should be noted that the methods, apparatuses, and/or aspects described above may be applied to, or used in accordance with, other systems, methods, apparatuses, and/or aspects described in this disclosure.

BRIEF DESCRIPTION OF FIGURES

The present disclosure, in accordance with one or more various embodiments, is described in detail with reference to the following figures. The drawings are provided for purposes of illustration only and merely depict typical or example embodiments. These drawings are provided to facilitate an understanding of the concepts disclosed herein and shall not be considered limiting of the breadth, scope, or applicability of these concepts. It should be noted that for clarity and ease of illustration these drawings are not necessarily made to scale.

The above and other objects and advantages of the disclosure may be apparent upon consideration of the following detailed description, taken in conjunction with the accompanying drawings, in which.

DESCRIPTION

Computer-implemented methods and systems are described herein for receiving a request for data based on an inquiry of a portion of a text-based message, for amending at least a portion of the text-based message based on the requested data, and for presenting an amended portion of the text-based message at a user device. A text-based message as described herein can be any message sent between two or more parties/users and comprising alphanumeric characters, special characters, and/or images therein. A text-based message does not exclusively have to comprise alphanumeric characters and/or special characters. In some embodiments, a text-based message can comprise images, video recordings and/or audio recordings.

The disclosed methods and systems may be implemented on one or more computing devices. As referred to herein, the computing device can be any device comprising a processor and memory, for example, a television, a smart television, a set-top box, an integrated receiver decoder (IRD) for handling satellite television, a digital storage device, a digital media receiver (DMR), a digital media adapter (DMA), a streaming media device, a DVD player, a DVD recorder, a connected DVD, a local media server, a BLU-RAY player, a BLU-RAY recorder, a personal computer (PC), a laptop computer, a tablet computer, a WebTV box, a personal computer television (PC/TV), a PC media server, a PC media center, a handheld computer, a stationary telephone, a personal digital assistant (PDA), a mobile telephone, a portable video player, a portable music player, a portable gaming machine, a smartphone, a smartwatch, an augmented reality device, a mixed reality device, a virtual reality device, or any other television equipment, computing equipment, or wireless device, and/or combination of the same.

The methods and/or any instructions for performing any of the embodiments discussed herein may be encoded on computer-readable media. Computer-readable media includes any media capable of storing data. The computer-readable media may be transitory, including, but not limited to, propagating electrical or electromagnetic signals, or may be non-transitory, including, but not limited to, volatile and non-volatile computer memory or storage devices such as a hard disk, floppy disk, USB drive, DVD, CD, media cards, register memory, processor caches, random access memory (RAM), a solid-state drive (SSD) etc.

Figure 1:
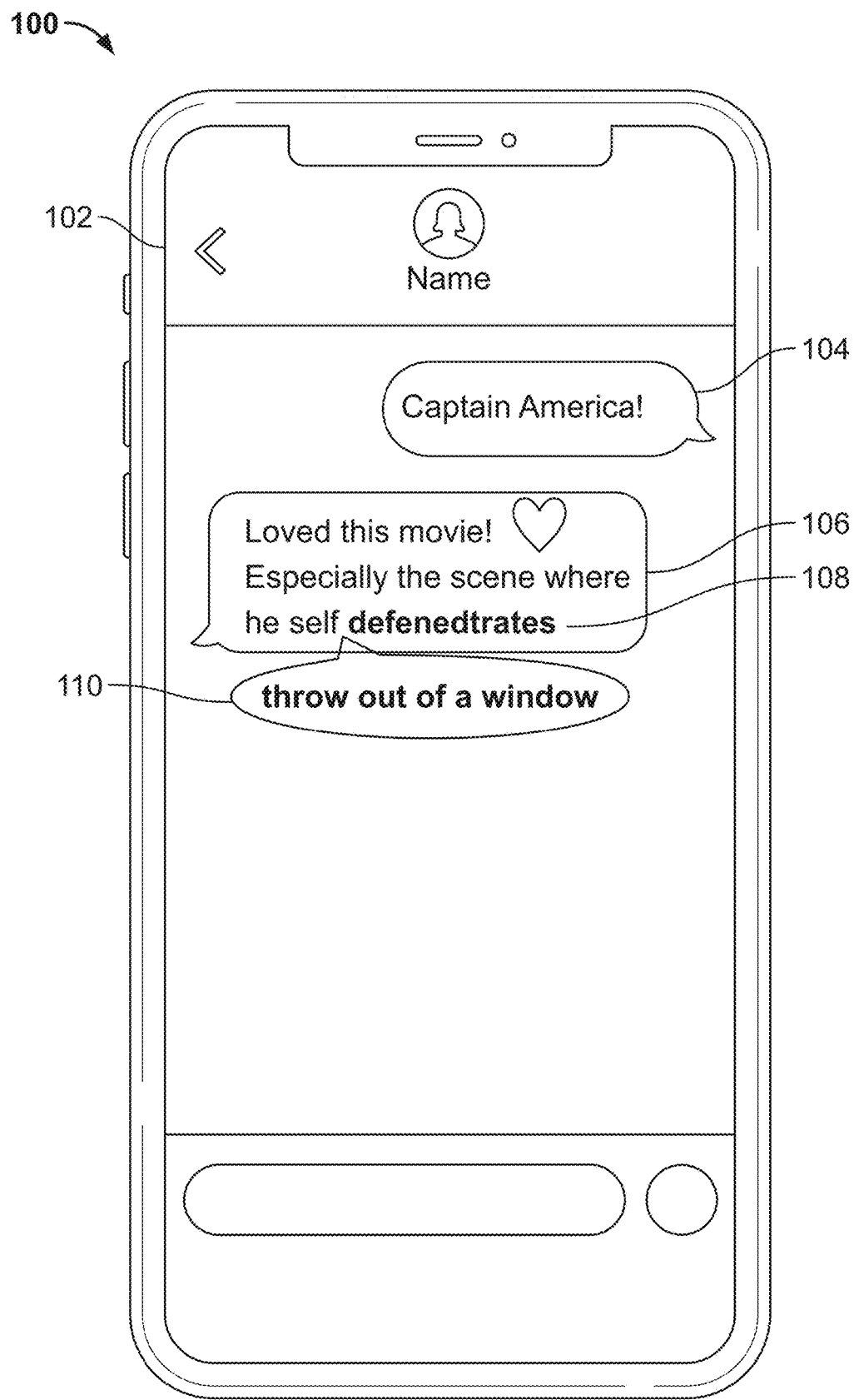
FIG. 1 shows an example user interface comprising a text-based message and an amended portion of the text-based message, in accordance with some embodiments of the disclosure.

FIG. 1 illustrates an example user interface 102 which displayed on a user device 100. User device 100 can be any suitable media device for presenting a user interface, as described below with reference to FIG. 3. The user interface 102 can be a graphical user interface (GUI) operable to display a plurality of different images. In an exemplary embodiment, user interface 102 can display a plurality of text-based messages 104, 106. Text-based message as referred herein refers to a media item comprising a word, an alphanumeric character, a special character, an image, a video, audio, or any combination thereof.

In the exemplary user interface 102, text-based message 104 "Captain America!" represents a graphical interpretation of a message sent by the sender (for example, the user of the user device 100). Text-based message 106 "Loved this movie! Especially the scene where he self defenestrates" represents a graphical interpretation of a message received at the user device 100 from a source (for example, sent by a different user device in communication with this user device 100 by way of a communications network as will be described in more detail with reference to FIGS. 2 and 4 below).

When sending messages in on user devices, such as user device 100, confusions can arise when a portion of the text-based message is unclear, for example, by comprising an error and/or an unknown or non-comprehendible word or phrase. Such an error and/or unknown or non-comprehendible word or phrase could, for example, be a misspelling of at least one word, a correct spelling of at least one word where the meaning of the word is not known to a user of the user device, a set of words comprising at least one word in a language different to the set of words, or a combination of the above. In such instances where the text-based message has already been received, there is a need for the user of user device 100 to raise an inquiry on that portion 108 of the text-based message and to display alternative and/or amended portions 110 of the text-based message to the user on the user device 100. In the exemplary user device 100 this is shown by highlighting the term "defenestrates" 108 of text-based message 106. Highlighting a portion 108 of the text-based message 106 can include receiving, at the user device 100, an input (for example, by clicking a word or a set of words on the user interface 102). Highlight a portion 108 of the text-based message can also include automatically selecting a word or a set of words by the system of the user device 100 as will be described in more detail below with reference to FIGS. 5 to 8. Once a portion 108 of the text-based message 106 has been identified to be unclear, the user can be notified of alternative and/or amended portions 110 of the text-based message 106 (for example, by presenting them on the user interface 102 as shown by 110). Further details of this will be described below with reference to FIGS. 5 to 8.

The exemplary user interface 102 of FIG. 1 is not limited to text-messages. For example, text-based message 106 can represent a live or pre-recorded video feed presented to the user such as a representation of an online classroom. Therein, text-based message 106 can comprise any type of media items such as, but not limited to, audio, video and imagery items. The portion 108 of the text-based message 106 can be identified by sampling the audio/video items into still images. Subsequently, the portion 108 of the text-based message 106 can be identified and the alternative and/or amended portions 110 of the text-based message 106 can be presented in a similar manner as described above. This is described in more detail below with reference to FIG. 8.

Figure 2:
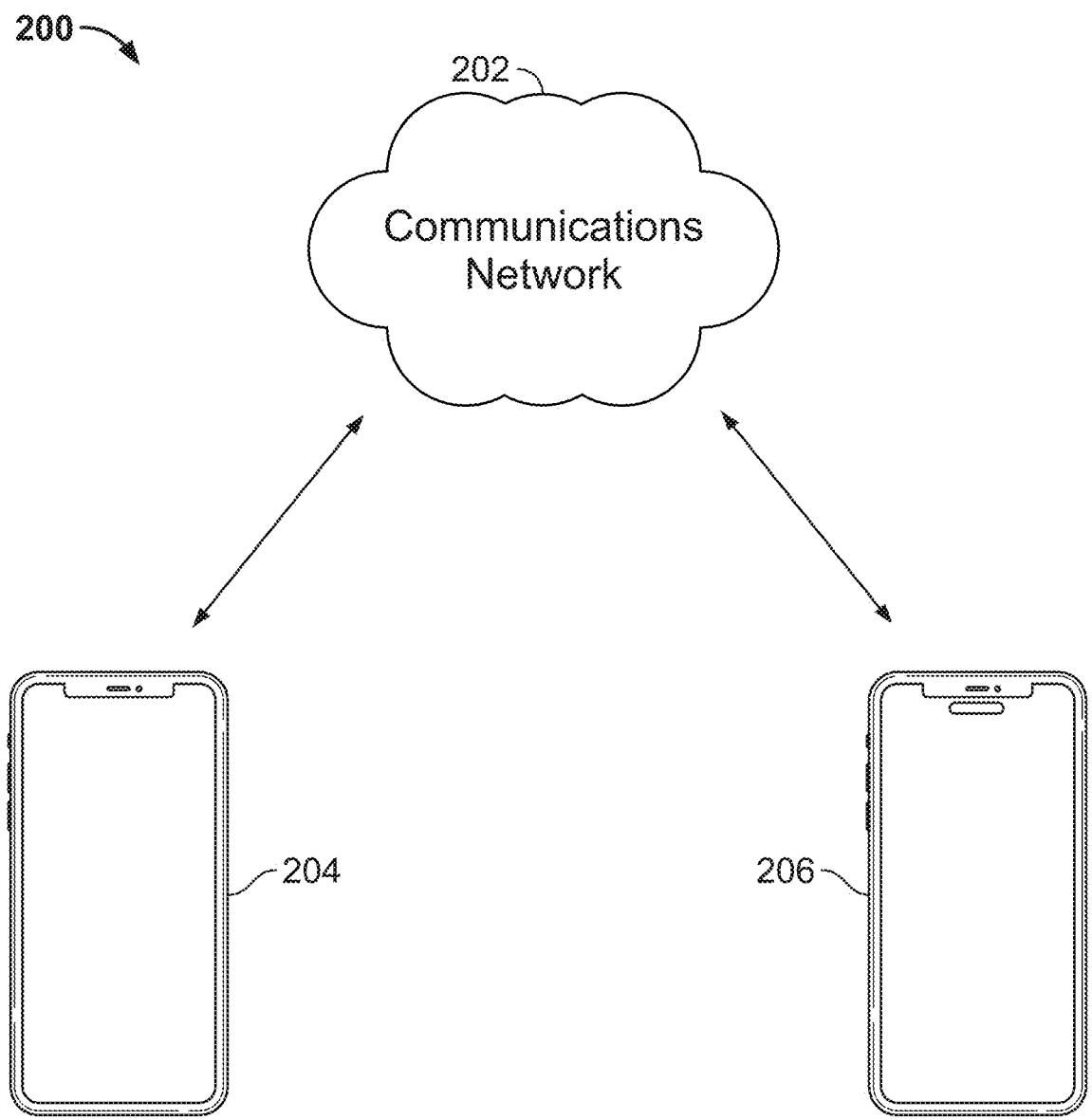
FIG. 2 shows a block diagram of devices communicating with a communications network, in accordance with some embodiments of the disclosure.

FIG. 2 illustrates a network 200 of user devices 204, 206 communicating with each other through a communications network 202. Although only two user devices 204, 206 are illustrated in FIG. 2, the present invention is not limited to two user device communicating with each other but can include any number of user devices communicating with one another. User devices 204, 206 are substantially similar to user device 100 and media device 300 as described above and below with reference to FIGS. 1 and 3, respectively. Communications network 202 is substantially similar to communications network 414 as described below with reference to FIG. 4. Communications network 202 and user devices 204 and 206 may communicate with one another via communication paths, such as communication paths 408, 410, 412, and 420 as also described below with reference to FIG. 4. In some embodiments, user devices 204 and 206 can employ peer-to-peer communications with or without communications network 202.

User devices 204 and 206 can represent user devices of a first user and a second user in communication with each other. User devices 204 and 206 each comprise memory (not shown) storing instructions, communication paths, and control circuitry coupled to the communication paths and the memory, the control circuitry operable to carry out sending and receiving functions. For example, user device 204 is operable to send and receive text-based messages (for example, text-based message 104 and 106) to user device 206 and any other user device in the network 200. Similarly, user device 206 is also operable to send and receive text-based messages 104, 106 to user device 204 and any other user device in the network 200. User devices 204 and 206 are also operable to send and receive an inquiry of a portion of the text-based message from and to each other as described above and below.

In some examples, one of the user devices 204, 206 within the network 200 can be a host of a group of a plurality of user devices 204, 206. This host can, optionally, be the only user device 204, 206 comprising permission to send text-based messages 106. This can be particularly useful in an online classroom with a tutor having the sole permission to broadcast a (live or pre-recorded) video 106 of the classroom content. The other user devices 204, 206 can still have permission to raise inquiries of a portion 108 of the text-based message/video 106 and request an alternative and/or amended portions 110 of the text-based message 106 which can be presented 110 on any one of the plurality of other (non-host) user devices 204, 206. This is described in more detail below with reference to FIG. 8.

Figure 3:
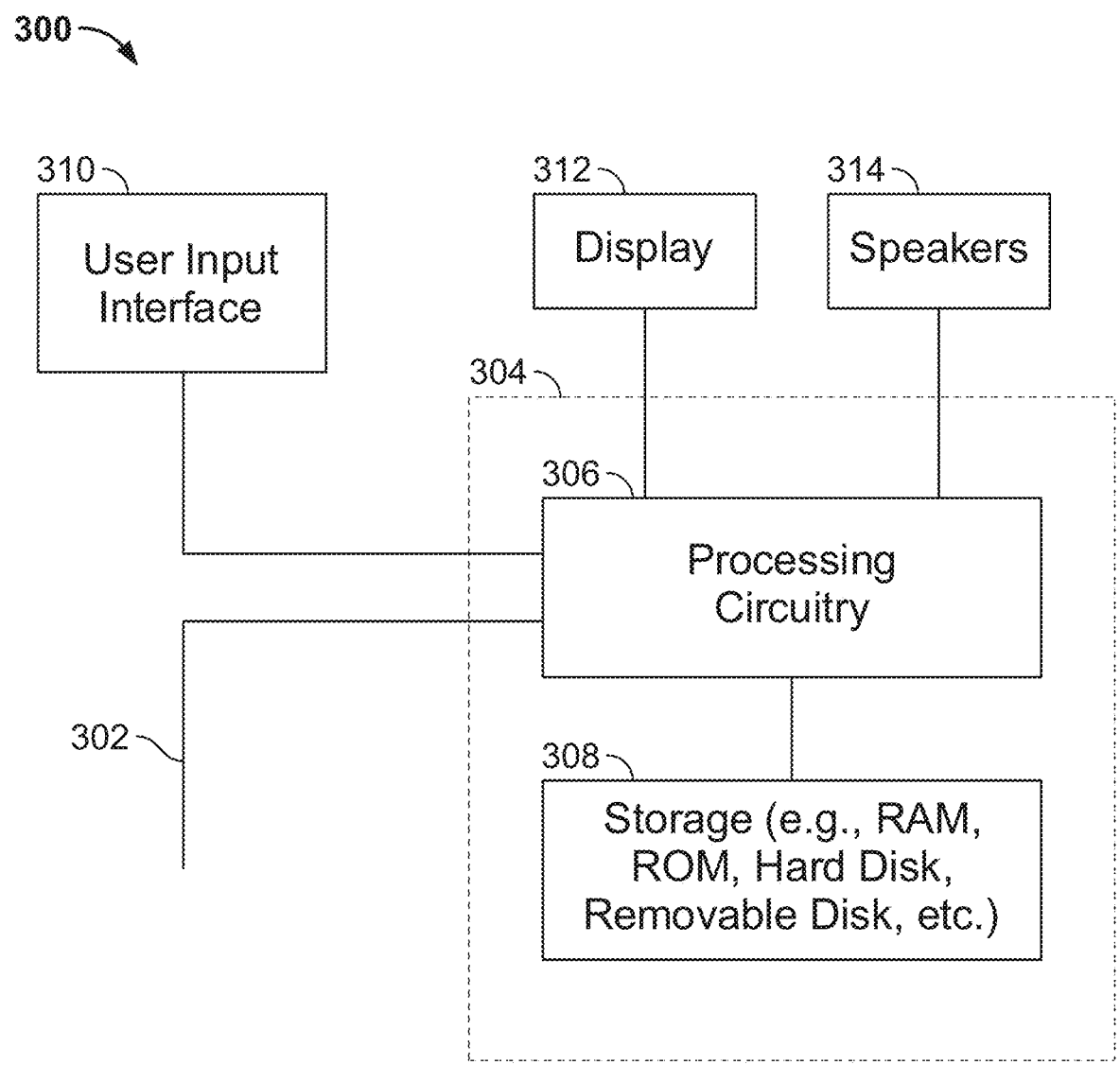
FIG. 3 shows a block diagram of a media device and of control circuitry comprising a processor and memory, in accordance with some embodiments of the disclosure.

FIG. 3 shows a block diagram of a media device 300 and of control circuitry comprising a processor and memory, in accordance with some embodiments of the disclosure. Users (e.g., users of user device 100, 204, 206 as described above with reference to FIGS. 1 and 2) may access media items, such as text-based messages 106 and/or data to amend the text-based messages on a media device 300 from one or more of their user equipment devices 300. FIG. 3 shows a generalized embodiment of illustrative user equipment device 300. More specific implementations of user equipment devices are discussed below in connection with FIG. 4. User equipment device 300 may receive content and data via input/output ("I/O") path 302. I/O path 302 may provide content (for example, broadcast programming, on-demand programming, Internet content, content available over a local area network (LAN) or wide area network (WAN), and/or other content) and data to control circuitry 304, which includes processing circuitry 306 and storage 308. Control circuitry 304 may be used to send and receive commands, requests, and other suitable data using I/O path 302. I/O path 302 may connect control circuitry 304 (and specifically processing circuitry 306) to one or more communication paths (as described below with reference to FIG. 4). I/O functions may be provided by one or more of these communication paths, but are shown as a single path in FIG. 3 to avoid overcomplicating the drawing.

Control circuitry 304 may be based on any suitable processing circuitry such as processing circuitry 306. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (for example, dual-core, quad-core, hexa-core, or any suitable number of cores) or supercomputer. In some embodiments, processing circuitry may be distributed across multiple separate processors or processing units, for example, multiple of the same type of processing units (for example, two Intel Core i7 processors) or multiple different processors (for example, an Intel Core i5 processor and an Intel Core i7 processor).

In client/server-based embodiments, control circuitry 304 may include communications circuitry suitable for communicating with a guidance application server or other networks or servers. The instructions for carrying out the above-mentioned functionality may be stored on the guidance application server. Communications circuitry may include a cable modem, an integrated services digital network (ISDN) modem, a digital subscriber line (DSL) modem, a telephone modem, an Ethernet card, or a wireless modem for communications with other equipment, or any other suitable communications circuitry. Such communications may involve the Internet or any other suitable communications networks or paths (which are described below in more detail in connection with FIG. 4). In addition, communications circuitry may include circuitry that enables peer-to-peer communication of user equipment devices, or communication of user equipment devices in locations remote from each other (described in more detail below).

Memory may be an electronic storage device provided as storage 308 that is part of control circuitry 304. In some embodiments, storage 308 may me coupled to processing circuitry 306 (for example, by I/O communication paths). As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVRs, sometimes called personal video recorders, or PVRs), solid state devices, quantum storage devices, gaming consoles, gaming media, or any other suitable fixed or removable storage devices, and/or any combination of the same. Storage 308 may be used to store various types of content described herein as well as media guidance data described below. Nonvolatile memory may also be used (for example, to launch a boot-up routine and other instructions). Cloud-based storage, described in relation to FIG. 4, may be used to supplement storage 308 or instead of storage 308.

Control circuitry 304 may include video generating circuitry and tuning circuitry, such as one or more analog tuners, one or more MPEG-2 decoders or other digital decoding circuitry, high-definition tuners, or any other suitable tuning or video circuits or combinations of such circuits. Encoding circuitry (for example, for converting over-the-air, analog, or digital signals to MPEG signals for storage) may also be provided. Control circuitry 304 may also include scaler circuitry for upconverting and downconverting content into the preferred output format of the user equipment 300. Control circuitry 304 may also include digital-to-analog converter circuitry and analog-to-digital converter circuitry for converting between digital and analog signals. The tuning and encoding circuitry may be used by the user equipment device to receive and to display, to play, or to record content. The tuning and encoding circuitry may also be used to receive guidance data. The circuitry described herein, including for example, the tuning, video generating, encoding, decoding, encrypting, decrypting, scaler, and analog/digital circuitry, may be implemented using software running on one or more general purpose or specialized processors. Multiple tuners may be provided to handle simultaneous tuning functions (for example, watch and record functions, picture-in-picture (PIP) functions, multiple-tuner recording, etc.). If storage 308 is provided as a separate device from user equipment 300, the tuning and encoding circuitry (including multiple tuners) may be associated with storage 308.

A user may send instructions to control circuitry 304 using user input interface 310. User input interface 310 may be any suitable user interface, such as a remote control, mouse, trackball, keypad, keyboard, touch screen, touchpad, stylus input, joystick, voice recognition interface, or other user input interfaces. Display 312 may be provided as a stand-alone device or integrated with other elements of user equipment device 300. For example, display 312 may be a touchscreen or touch-sensitive display. In such circumstances, user input interface 310 may be integrated with or combined with display 312. Display 312 may be one or more of a monitor, a television, a liquid crystal display (LCD) for a mobile device, amorphous silicon display, low temperature poly silicon display, electronic ink display, electrophoretic display, active matrix display, electro-wetting display, electrofluidic display, cathode ray tube display, light-emitting diode display, electroluminescent display, plasma display panel, high-performance addressing display, thin-film transistor display, organic light-emitting diode display, surface-conduction electron-emitter display (SED), laser television, carbon nanotubes, quantum dot display, interferometric modulator display, or any other suitable equipment for displaying visual images. In some embodiments, display 312 may be HDTV-capable. In some embodiments, display 312 may be a 3D display, and the interactive media guidance application and any suitable content may be displayed in 3D. A video card or graphics card may generate the output to the display 312. The video card may offer various functions such as accelerated rendering of 3D scenes and 2D graphics, MPEG-2/MPEG-4 decoding, TV output, or the ability to connect multiple monitors. The video card may be any processing circuitry described above in relation to control circuitry 304. The video card may be integrated with the control circuitry 304. Speakers 314 may be provided as integrated with other elements of user equipment device 300 or may be stand-alone units. The audio component of videos and other content displayed on display 312 may be played through speakers 314. In some embodiments, the audio may be distributed to a receiver (not shown), which processes and outputs the audio via speakers 314.

The guidance application may be implemented using any suitable architecture. For example, it may be a stand-alone application wholly-implemented on user equipment device 300. In such an approach, instructions of the application are stored locally (for example, in storage 308), and data for use by the application is downloaded on a periodic basis (for example, from an out-of-band feed, from an Internet resource, or using another suitable approach). Control circuitry 304 may retrieve instructions of the application from storage 308 and process the instructions to generate any of the displays discussed herein. Based on the processed instructions, control circuitry 304 may determine what action to perform when input is received from input interface 310. For example, movement of a cursor on a display up/down may be indicated by the processed instructions when input interface 310 indicates that an up/down button was selected.

In some embodiments, the media guidance application is a client-server based application. Data for use by a thick or thin client implemented on user equipment device 300 is retrieved on-demand by issuing requests to a server remote from the user equipment device 300. In one example of a client-server based guidance application, control circuitry 304 runs a web browser that interprets web pages provided by a remote server. For example, the remote server may store the instructions for the application in a storage device. The remote server may process the stored instructions using circuitry (for example, control circuitry 304) and generate the displays discussed above and below. The client device may receive the displays generated by the remote server and may display the content of the displays locally on equipment device 300. This way, the processing of the instructions is performed remotely by the server while the resulting displays are provided locally on equipment device 300. Equipment device 300 may receive inputs from the user via input interface 310 and transmit those inputs to the remote server for processing and generating the corresponding displays. For example, equipment device 300 may transmit a communication to the remote server indicating that an up/down button was selected via input interface 310. The remote server may process instructions in accordance with that input and generate a display of the application corresponding to the input (for example, a display that moves a cursor up/down). The generated display is then transmitted to equipment device 300 for presentation to the user.

In some embodiments, the media guidance application is downloaded and interpreted or otherwise run by an interpreter or virtual machine (run by control circuitry 304). In some embodiments, the guidance application may be encoded in the ETV Binary Interchange Format (EBIF), received by control circuitry 304 as part of a suitable feed, and interpreted by a user agent running on control circuitry 304. For example, the guidance application may be an EBIF application. In some embodiments, the guidance application may be defined by a series of JAVA-based files that are received and run by a local virtual machine or other suitable middleware executed by control circuitry 304. In some of such embodiments (for example, those employing MPEG-2 or other digital media encoding schemes), the guidance application may be, for example, encoded and transmitted in an MPEG-2 object carousel with the MPEG audio and media item of a schedule.

Figure 4:
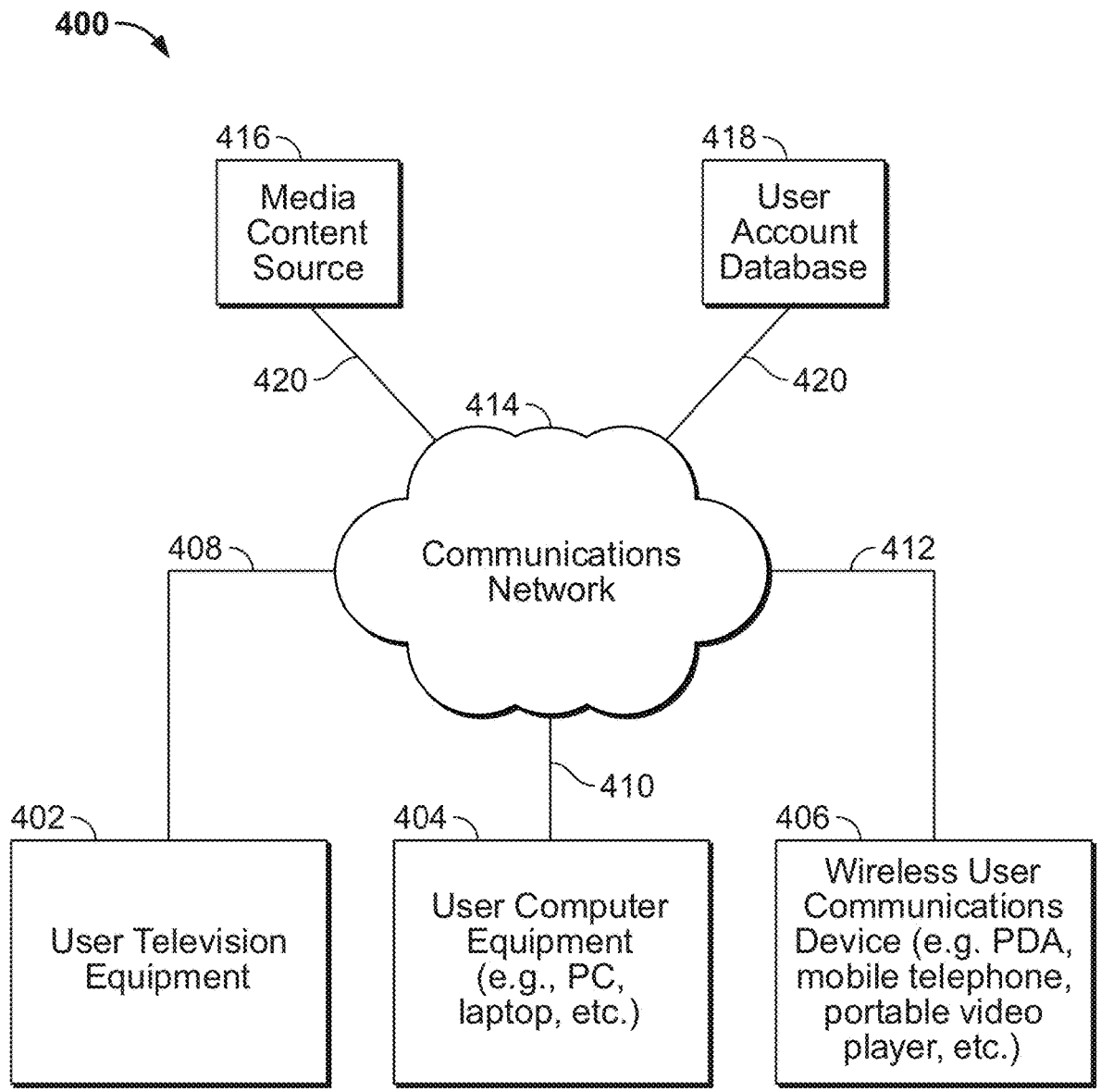
FIG. 4 shows a block diagram of an illustrative media system, in accordance with some embodiments of the disclosure.

FIG. 4 a block diagram of an illustrative media system 400, in accordance with some embodiments of the disclosure implementing a user device (such as the user device 300 as depicted in FIG. 3 above) as a user television equipment 402, user computer equipment 404, wireless user communications device 406, or any other type of user equipment suitable for accessing content, such as a non-portable gaming machine. The user television equipment 402, user computer equipment 404, wireless user communications device 406, or any other type of user equipment suitable for accessing content may be substantially similar to user device 300 as described above with reference to FIG. 3. For simplicity, these devices may be referred to herein collectively as user equipment or user equipment devices, and may be substantially similar to user equipment devices described below. User equipment devices, on which a media guidance application may be implemented, may function as standalone devices or may be part of a network of devices. Various network configurations of devices may be implemented and are discussed in more detail below.

A user equipment device utilizing at least some of the system features described above in connection with FIG. 3 may not be classified solely as user television equipment 402, user computer equipment 404, or a wireless user communications device 406. For example, user television equipment 402 may, like some user computer equipment 404, be Internet-enabled, allowing for access to Internet content, while user computer equipment 404 may, like some television equipment 402, include a tuner allowing for access to television programming. The media guidance application may have the same layout on various different types of user equipment or may be tailored to the display capabilities of the user equipment. For example, on user computer equipment 404, the guidance application may be provided as a web site accessed by a web browser. In another example, the guidance application may be scaled down for wireless user communications devices 406.

In system 400, there is typically more than one of each type of user equipment device but only one of each is shown in FIG. 4 to avoid overcomplicating the drawing. In addition, each user may utilize more than one type of user equipment device and also more than one of each type of user equipment device.

In some embodiments, a user equipment device (for example, user television equipment 402, user computer equipment 404, wireless user communications device 406) may be referred to as a "second screen device." For example, a second screen device may supplement content presented on a first user equipment device. The content presented on the second screen device may be any suitable content that supplements the content presented on the first device. In some embodiments, the second screen device provides an interface for adjusting settings and display preferences of the first device. In some embodiments, the second screen device is configured for interacting with other second screen devices or for interacting with a social network. The second screen device can be located in the same room as the first device, a different room from the first device but in the same house or building, or in a different building from the first device.

The user may also set various settings to maintain consistent media guidance application settings across in-home devices and remote devices. Settings include those described herein, as well as channel and program favorites, programming preferences that the guidance application utilizes to make programming recommendations, display preferences, and other desirable guidance settings. For example, if a user sets a channel as a favorite on, for example, the web site www.allrovi.com on their personal computer at their office, the same channel would appear as a favorite on the user's in-home devices (for example, user television equipment and user computer equipment) as well as the user's mobile devices, if desired. Therefore, changes made on one user equipment device can change the guidance experience on another user equipment device, regardless of whether they are the same or a different type of user equipment device. In addition, the changes made may be based on settings input by a user, as well as user activity monitored by the guidance application.

The user equipment devices may be coupled to communications network 414. Namely, user television equipment 402, user computer equipment 404, and wireless user communications device 406 are coupled to communications network 414 via communication paths 408, 410, and 412, respectively. Communications network 414 may be one or more networks including the Internet, a mobile phone network, mobile voice or data network (for example, a 4G or LTE network), cable network, public switched telephone network, or other types of communications network or combinations of communications networks. Paths 408, 410, and 412 may separately or together include one or more communication paths, such as, a satellite path, a fiber-optic path, a cable path, a path that supports Internet communications (for example, IPTV), free-space connections (for example, for broadcast or other wireless signals), or any other suitable wired or wireless communication path or combination of such paths. Paths 408, 410, and 412 may each be a wireless path or wired path. Communications with the user equipment devices may be provided by one or more of these communication paths, but are shown as a single path for each device in FIG. 4 to avoid overcomplicating the drawing.

Although communication paths are not drawn between user equipment devices, these devices may communicate directly with each other via communication paths, such as those described above in connection with paths 408, 410, and 412, as well as other short-range point-to-point communication paths, such as USB cables, IEEE 1394 cables, wireless paths (for example, Bluetooth, infrared, IEEE 802-11x, etc.), or other short-range communication via wired or wireless paths. BLUETOOTH is a certification mark owned by Bluetooth SIG, INC. The user equipment devices may also communicate with each other directly through an indirect path via communications network 414.

System 400 includes media content source 416 and user account database 418 coupled to communications network 414 via communication paths 420, respectively. User account database 418 may store previously determined inquiries of portions of text-based messages (as described below with reference to FIGS. 5 to 8). Path 420 may include any of the communication paths described above in connection with paths 408, 410, and 412. Communications with the media content source 416 and user account database 418 may be exchanged over one or more communication paths, but are shown as a single path in FIG. 4 to avoid overcomplicating the drawing. In addition, there may be more than one of each of content source 416 and user account database 418, but only one of each is shown in FIG. 4 to avoid overcomplicating the drawing. (The different types of each of these sources are discussed below.) If desired, media content source 416 and user account database 418 may be integrated as one source device. Although communications between sources 416 and 418 with user equipment 402, 404, and 406 are shown as through communications network 414, in some embodiments, sources 416 and 418 may communicate directly with user equipment 402, 404, and 406 via communication paths (not shown) such as those described above in connection with paths 408, 410, and 412.

Media content source 416 may include one or more types of content distribution equipment including a television distribution facility, cable system headend, satellite distribution facility, programming sources (for example, television broadcasters, such as NBC, ABC, HBO, etc.), intermediate distribution facilities and/or servers, Internet providers, on-demand media servers, and other content providers. NBC is a trademark owned by the National Broadcasting Company, Inc., ABC is a trademark owned by the American Broadcasting Company, Inc., and HBO is a trademark owned by the Home Box Office, Inc. Media content source 416 may be the originator of content (for example, a television broadcaster, a Webcast provider, etc.) or may not be the originator of content (for example, an on-demand content provider, an Internet provider of content of broadcast schedules for downloading, etc.). Media content source 416 may include cable sources, satellite providers, on-demand providers, Internet providers, over-the-top content providers, or other providers of content. Media content source 416 may also include a remote media server used to store different types of content (including video content selected by a user), in a location remote from any of the user equipment devices. Systems and methods for remote storage of content, and providing remotely stored content to user equipment are discussed in greater detail in connection with Ellis et al., U.S. Pat. No. 7,761,892, issued Jul. 20, 2010, which is hereby incorporated by reference herein in its entirety.

User Account Database 418 is optionally coupled to communications network 414 and may comprise a database of user accounts, their preferences and which genres of media asset they are interested in. Each user account may update their preferences and interested genres on the user preference database at any point. User Account Database 418 may further comprise previously determined inquiries of portions of text-based messages (as described below with reference to FIGS. 5 to 8).

In addition to this, system 400 may include a media guidance data source (not shown). Media guidance data source be coupled to communications network 414 via communications path 420. Communications with the media content source 416 and user account database 418 and the media guidance data source may be exchanged over one or more communication paths. Media guidance data source may provide media guidance data, such as the media guidance data described above and below. Media guidance data may be provided to the user equipment devices using any suitable approach. In some embodiments, the guidance application may be a stand-alone interactive television program guide that receives program guide data via a data feed (for example, a continuous feed or trickle feed). Program schedule data and other guidance data may be provided to the user equipment on a television channel sideband, using an in-band digital signal, using an out-of-band digital signal, or by any other suitable data transmission technique. Program schedule data and other media guidance data may be provided to user equipment on multiple analog or digital television channels.

In some embodiments, guidance data from media guidance data source may be provided to users' equipment using a client/server approach. For example, a user equipment device may pull media guidance data from a server, or a server may push media guidance data to a user equipment device. In some embodiments, a guidance application client residing on the user's equipment may initiate sessions with source to obtain guidance data when needed, for example, when the guidance data is out of date or when the user equipment device receives a request from the user to receive data. Media guidance may be provided to the user equipment with any suitable frequency (for example, continuously, daily, a user-specified period of time, a system-specified period of time, in response to a request from user equipment, etc.). Media guidance data source may provide user equipment 402, 404, and 406 the media guidance application itself or software updates for the media guidance application.

In some embodiments, the media guidance data may include viewer data. For example, the viewer data may include current and/or historical user activity information (for example, what content the user typically watches, what times of day the user watches content, whether the user interacts with a social network, at what times the user interacts with a social network to post information, what types of content the user typically watches (for example, pay TV or free TV), mood, brain activity information, etc.). The media guidance data may also include subscription data. For example, the subscription data may identify to which sources or services a given user subscribes and/or to which sources or services the given user has previously subscribed but later terminated access (for example, whether the user subscribes to premium channels, whether the user has added a premium level of services, whether the user has increased Internet speed). In some embodiments, the viewer data and/or the subscription data may identify patterns of a given user for a period of more than one year. The media guidance data may include a model (for example, a survivor model) used for generating a score that indicates a likelihood a given user will terminate access to a service/source. For example, the media guidance application may process the viewer data with the subscription data using the model to generate a value or score that indicates a likelihood of whether the given user will terminate access to a particular service or source. In particular, a higher score may indicate a higher level of confidence that the user will terminate access to a particular service or source. Based on the score, the media guidance application may generate promotions that entice the user to keep the particular service or source indicated by the score as one to which the user will likely terminate access.

Media guidance applications may be, for example, stand-alone applications implemented on user equipment devices. For example, the media guidance application may be implemented as software or a set of executable instructions which may be stored in storage 308, and executed by control circuitry 304 of a user equipment device 300. In some embodiments, media guidance applications may be client-server applications where only a client application resides on the user equipment device, and server application resides on a remote server. For example, media guidance applications may be implemented partially as a client application on control circuitry 304 of user equipment device 300 and partially on a remote server as a server application (for example, media guidance data source) running on control circuitry of the remote server. When executed by control circuitry of the remote server (such as media guidance data source), the media guidance application may instruct the control circuitry to generate the guidance application displays and transmit the generated displays to the user equipment devices. The server application may instruct the control circuitry of the media guidance data source to transmit data for storage on the user equipment. The client application may instruct control circuitry of the receiving user equipment to generate the guidance application displays.

Content and/or media guidance data delivered to user equipment 402, 404, and 406 may be over-the-top (OTT) content. OTT content delivery allows Internet-enabled user devices, including any user equipment device described below, to receive content that is transferred over the Internet, including any content described above, in addition to content received over cable or satellite connections. OTT content is delivered via an Internet connection provided by an Internet service provider (ISP), but a third party distributes the content. The ISP may not be responsible for the viewing abilities, copyrights, or redistribution of the content, and may only transfer IP packets provided by the OTT content provider. Examples of OTT content providers include YOUTUBE, NETFLIX, and HULU, which provide audio and video via IP packets. Youtube is a trademark owned by Google Inc., Netflix is a trademark owned by Netflix Inc., and Hulu is a trademark owned by Hulu, LLC. OTT content providers may additionally or alternatively provide media guidance data described above. In addition to content and/or media guidance data, providers of OTT content can distribute media guidance applications (for example, web-based applications or cloud-based applications), or the content can be displayed by media guidance applications stored on the user equipment device.

Media guidance system 400 is intended to illustrate a number of approaches, or network configurations, by which user equipment devices and sources of content and guidance data may communicate with each other for the purpose of accessing content and providing media guidance. The embodiments described herein may be applied in any one or a subset of these approaches, or in a system employing other approaches for delivering content and providing media guidance. The following four approaches provide specific illustrations of the generalized example of FIG. 4.

In one approach, user equipment devices may communicate with each other within a home network. User equipment devices can communicate with each other directly via short-range point-to-point communication schemes described above, via indirect paths through a hub or other similar device provided on a home network, or via communications network 414. Each of the multiple individuals in a single home may operate different user equipment devices on the home network. As a result, it may be desirable for various media guidance information or settings to be communicated between the different user equipment devices. For example, it may be desirable for users to maintain consistent media guidance application settings on different user equipment devices within a home network, as described in greater detail in Ellis et al., U.S. Patent Publication No. 2005/0251827, filed Jul. 11, 2005, which is hereby incorporated by reference herein in its entirety. Different types of user equipment devices in a home network may also communicate with each other to transmit content. For example, a user may transmit content from user computer equipment to a portable video player or portable music player.

In a second approach, users may have multiple types of user equipment by which they access content and obtain media guidance. For example, some users may have home networks that are accessed by in-home and mobile devices. Users may control in-home devices via a media guidance application implemented on a remote device. For example, users may access an online media guidance application on a website via a personal computer at their office, or a mobile device such as a PDA or web-enabled mobile telephone. The user may set various settings (for example, recordings, reminders, or other settings) on the online guidance application to control the user's in-home equipment. The online guide may control the user's equipment directly, or by communicating with a media guidance application on the user's in-home equipment. Various systems and methods for user equipment devices communicating, where the user equipment devices are in locations remote from each other, is discussed in, for example, Ellis et al., U.S. Pat. No. 8,046,801, issued Oct. 25, 2011, which is hereby incorporated by reference herein in its entirety.

In a third approach, users of user equipment devices inside and outside a home can use their media guidance application to communicate directly with media content source 416 to access content. Specifically, within a home, users of user television equipment 402 and user computer equipment 404 may access the media guidance application to navigate among and locate desirable content. Users may also access the media guidance application outside of the home using wireless user communications devices 406 to navigate among and locate desirable content.

In a fourth approach, user equipment devices may operate in a cloud computing environment to access cloud services. In a cloud computing environment, various types of computing services for content sharing, storage or distribution (for example, video sharing sites or social networking sites) are provided by a collection of network-accessible computing and storage resources, referred to as "the cloud." For example, the cloud can include a collection of server computing devices, which may be located centrally or at distributed locations, that provide cloud-based services to various types of users and devices connected via a network such as the Internet via communications network 414. These cloud resources may include one or more content sources 416, one or more and user account databases 418, and one or more media guidance data sources. In addition or in the alternative, the remote computing sites may include other user equipment devices, such as user television equipment 402, user computer equipment 404, and wireless user communications device 406. For example, the other user equipment devices may provide access to a stored copy of a video or a streamed video. In such embodiments, user equipment devices may operate in a peer-to-peer manner without communicating with a central server.

The cloud provides access to services, such as content storage, content sharing, or social networking services, among other examples, as well as access to any content described above, for user equipment devices. Services can be provided in the cloud through cloud computing service providers, or through other providers of online services. For example, the cloud-based services can include a content storage service, a content sharing site, a social networking site, or other services via which user-sourced content is distributed for viewing by others on connected devices. These cloud-based services may allow a user equipment device to store content to the cloud and to receive content from the cloud rather than storing content locally and accessing locally stored content.

A user may use various content capture devices, such as camcorders, digital cameras with video mode, audio recorders, mobile phones, and handheld computing devices, to record content. The user can upload content to a content storage service on the cloud either directly, for example, from user computer equipment 404 or wireless user communications device 406 having a content capture feature. Alternatively, the user can first transfer the content to a user equipment device, such as user computer equipment 404. The user equipment device storing the content uploads the content to the cloud using a data transmission service on communications network 414. In some embodiments, the user equipment device itself is a cloud resource, and other user equipment devices can access the content directly from the user equipment device on which the user stored the content.

Cloud resources may be accessed by a user equipment device using, for example, a web browser, a media guidance application, a desktop application, a mobile application, and/or any combination of access applications of the same. The user equipment device may be a cloud client that relies on cloud computing for application delivery, or the user equipment device may have some functionality without access to cloud resources. For example, some applications running on the user equipment device may be cloud applications, i.e., applications delivered as a service over the Internet, while other applications may be stored and run on the user equipment device. In some embodiments, a user device may receive content from multiple cloud resources simultaneously. For example, a user device can stream audio from one cloud resource while downloading content from a second cloud resource. Or a user device can download content from multiple cloud resources for more efficient downloading. In some embodiments, user equipment devices can use cloud resources for processing operations such as the processing operations performed by processing circuitry described in relation to FIG. 3.

Figure 5:
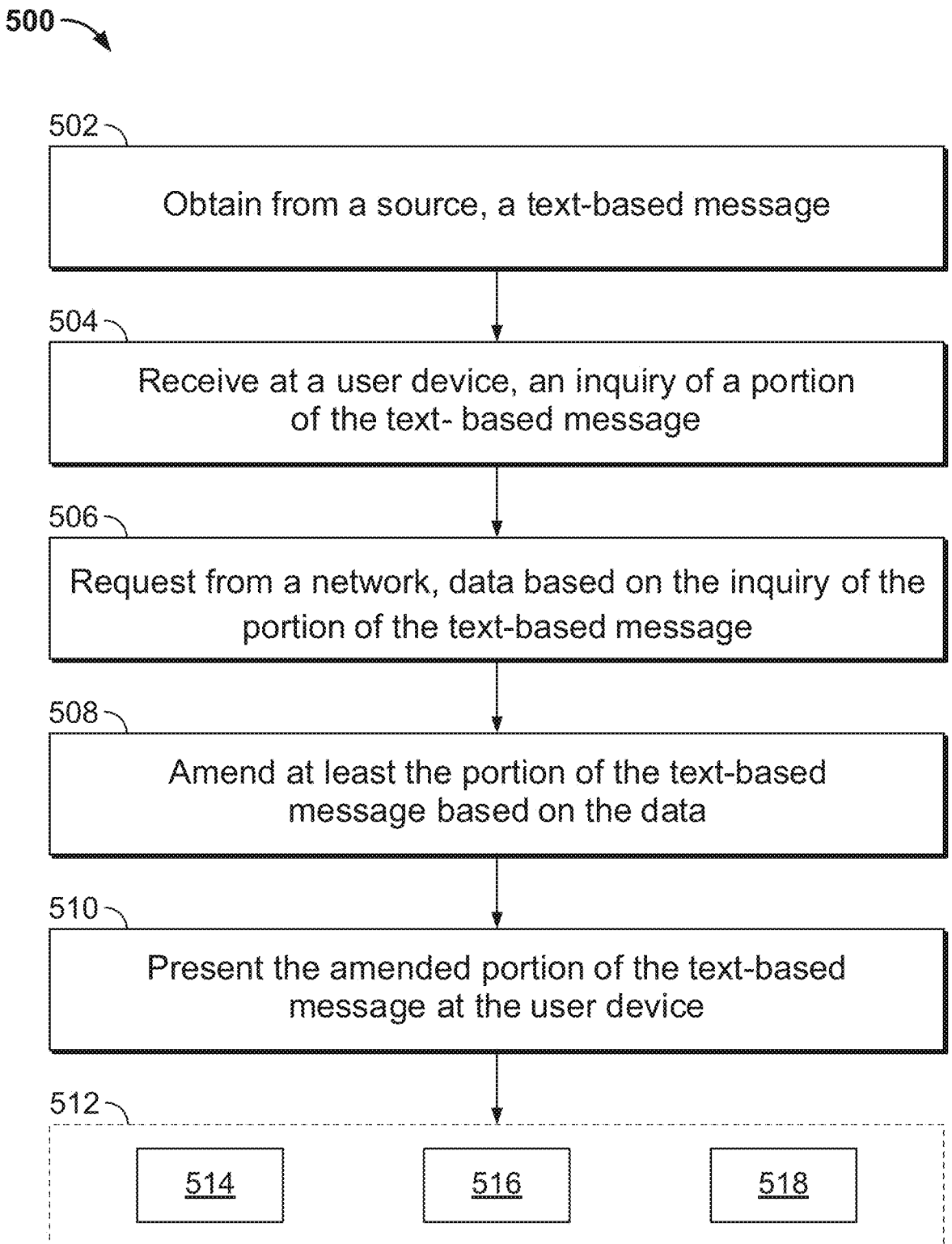
FIG. 5 shows a flowchart of illustrative steps involved in amending sent text-based messages, in accordance with some embodiments of the disclosure.

FIG. 5 is a flowchart 500 of illustrative steps involved in amending sent text-based messages, in accordance with the arrangement described above with reference to FIGS. 1 to 4. The steps in flowchart 500 can be carried out in a computer-implemented method. At step 502, a text-based message (for example, text-based message 106) is obtained, from a source (for example, a communications network which is in communication with another user device). At step 504, in inquiry of a portion of the text-based message (for example, portion 108) is received at a user device (for example, user device 100, 204, 206). The inquiry of the portion of the text-based message may comprise a misspelling of at least one word. The inquiry of the portion of the text-based message may further comprise a correct spelling of at least one word where the meaning of the word is not known to a user of the user device. The inquiry of the portion of the text-based message my further still comprise a set of words comprising at least one word that is syntactically different to the remaining words of the set of words. For example, the at least one word that is syntactically different could be in a different language to the remaining words of the set of words, based on the user device's primary language/region settings. The user's primary language/region settings can be set on the user device (for example, by accessing the 'settings' of the user device).

At step 506, additional data is requested, based on the inquiry of the portion 108 of the text-based message 106. This additional data is requested from a network (for example, the communications network as described above which is in communication with a plurality of servers and with a plurality of other user device as described above). In some embodiments, the additional data is requested from the source of the text-based message (for example, the sender of the text-based message) whereas in other embodiments the additional data is requested from a different server or user device than the source. At step 508, at least a portion of the text-based message 106 is amended based on the data. The text-based message 106 may comprise a word, an alphanumeric character, a special character, an image, or any combination of the above. Similarly, the portion of the text-based message may also comprise a word, an alphanumeric character, a special character, an image, or any combination of the above. For example, a recipient (for example, the user on user device 100) can receive a message (for example text-based message 106) containing one or more terms 108 that are not familiar to the user. Non-familiar terms can be any term that is not comprehendible to the recipient including a misspelling of a word, a correct spelling of a word but the meaning of the word is not known to the user, as well as a sentence that contains a word that is syntactically different by being, for example, in a different language to the user device's primary language/region, such as an English text that contains the word "bonne nuit" which means 'good night' in French.

At step 510, the amended portion (for example, amended portion 110) of the text-based message is presented at the user device 100, 204, 206. The computer-implemented method may comprise additional steps 512 which comprise steps 514, 516, and 518. These are described in more detail below with reference to FIG. 6.

Figure 6:
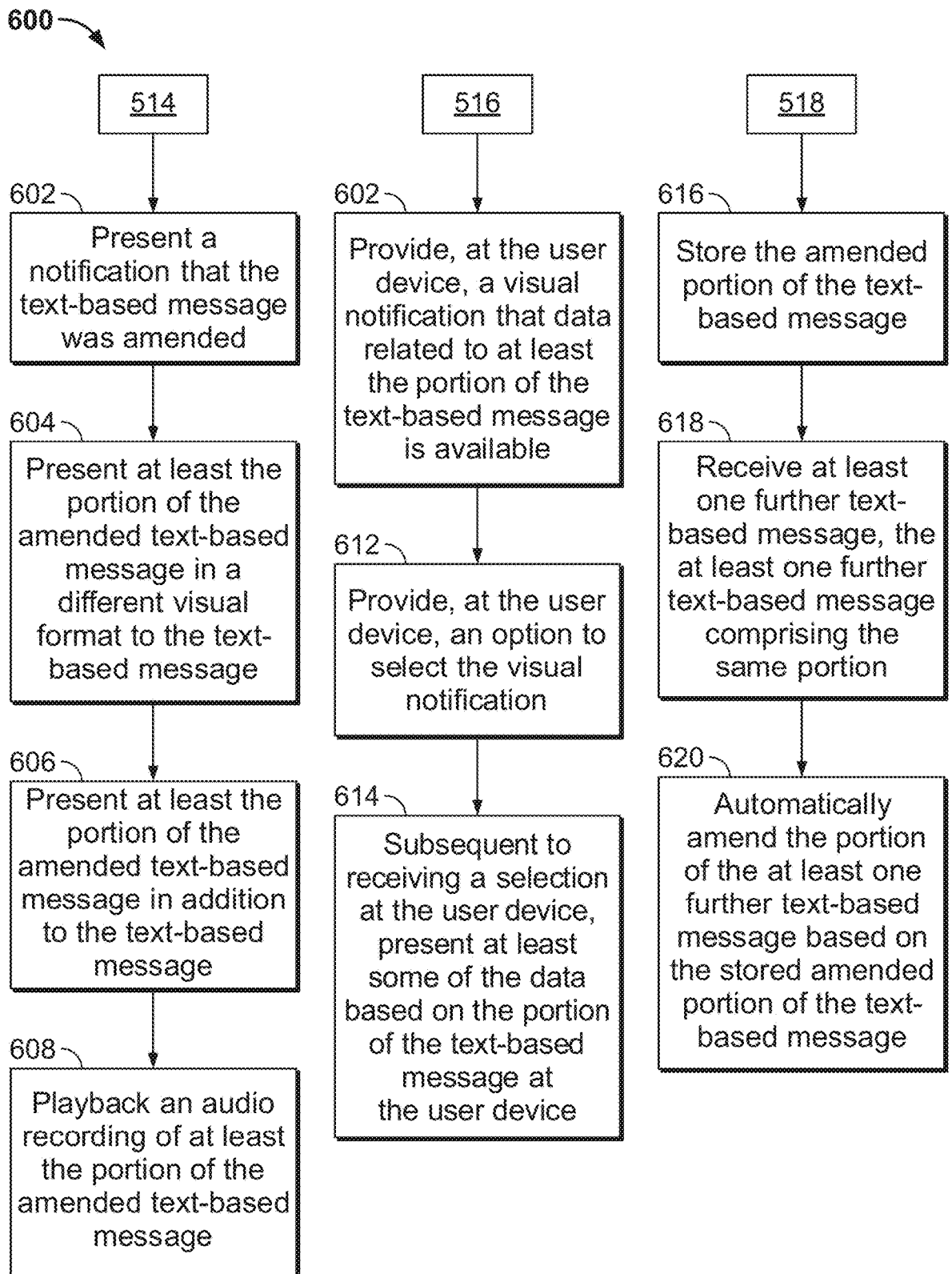
FIG. 6 shows another flowchart of illustrative steps involved in amending sent text-based messages, in accordance with some embodiments of the disclosure.

FIG. 6 is a flowchart 600 of illustrative steps involved in amending sent text-based messages which builds on from the features presented in FIG. 5 above, in accordance with the arrangement described above with reference to FIGS. 1 to 5. In particular, FIG. 6 provides more detail on additional steps 514, 516, and 518 as referred to above in FIG. 5. Although set out separately in FIG. 6, steps 514, 516 and 518 (and each of their corresponding steps) can be carried out together or separately from one another. Furthermore, steps 514, 516 and 518 (and each of their corresponding steps) can be carried out in any order.

In addition to the steps at FIG. 5, the computer-implemented method may further present 602 a notification that the text-based message was amended. The notification can comprise presenting 604 at least the portion of the amended text-based message in a different visual format to the text-based message. The portion of the text-based message 106 that was corrected can give the user a visual indication that some data related to the text, or the term exists, and simply clicking on the text message box will retrieve the additional data (i.e., the word quarantine). This way the user can always see the original message and manipulation of the original text-based message 106 is prohibited. This is useful when the sender and receiver are discussing sensitive information, such as a business deal (for example, one user provides services to the other users, such as landscaping services, etc.). These text records can be construed as an agreement in case of a misunderstanding or even a lawsuit. The above features are settings within the computer-implemented program that can be enabled or disabled in the application or user device's settings.

The notification can further comprise presenting 606 at least the portion of the amended text-based message in addition to the text-based message. The notification can further comprise playing back 608 an audio recording of at least the portion of the amended text-based message. In one embodiment, the portion of the amended text (e.g., correction of the misspelling or a synonym to explain the meaning of the word) can be read out loud by a smart assistant (for example, Alexa, Hey Google, Siri, etc.) on the user device 100. This acts as if the user invoked a "define" function—today, users can ask their smart assistant to define a term, by uttering the word 'define' followed by the 'term' they seek the definition to. Then text-to-speech (for example, Natural Language Processing (NLP)) can be utilized to communicate the answer of the inquiry to the user.

In addition to the steps at FIG. 5, the computer-implemented method may further provide 610, at the user device 100, 204, 206, a visual notification that data related to at least the portion of the text-based message is available. At step 612, the computer-implemented method may further provide at the user device 100, 204, 206, an option to select the visual notification. At step 614, the computer-implemented method may, subsequent to receiving a selection at the user device 100, 204, 206, present at least some of the data based on the portion of the text-based message 106 at the user device 100, 204, 206. Services (for example, translation, dictionary, misspelling detection, etc.) that are available to the user interface 102 of the user device 100 (for example, by means of communicating with programs on outside servers in communication with the communications network 202, 414) can allow responding to the inquiry without additional back and forth communication with the source/sender. If these services cannot resolve the terms that the recipient finds ambiguous or confusing, then the sender is notified and given options to responds, such as by highlighting the ambiguous or confusing term (for example, as shown by 108 in FIG. 1) for the sender.

In addition to the steps at FIG. 5, the computer-implemented method may further store 616 the amended portion of the text-based message. For example, every text-based message 106 can be associated with a unique ID, and any additional data that was generated (either automatically or by the sender) can be associated with this ID as well. The unique ID can also be associated with other information such as delivery date, time, and the user contact associated with it (for example, the user is texting with a contact that is stored in his or her contact information, phone number if contact info is not stored, etc.). Such ID can also be used to identify the text-based message 106 to the sender (for example, by clicking an "Ask Sender" function wherein the "Ask Sender" function represents a requesting, from the source, for additional data based on the inquiry of the portion of the text-based message as discussed above). This information is indexed to assist in data retrieval in response to future inquiry search requests.

At step 618, the computer-implemented method may further receive at least one further text-based message 106, the at least one further text-based message comprising the same portion. At step 620, the computer-implemented method may further automatically amend the portion of the at least one further text-based message based on the stored amended portion 110 of the text-based message 106. For example, the additional data (for example, metadata) that is generated (either automatically or manually) is tagged to the message. This is helpful to refresh the recipient's memory when they refer to it again. Automatically generated metadata means any data such as definitions, correction of a misspelling, or translation that was generated from a service associated or accessible to the messaging app (e.g., dictionary service). Such tag can be permanent (e.g., attached to the message) and listed above or below the message (i.e., is an extension to the message) or can be displayed when the user scrolls back to the message. In this scenario, the additional data is presented to the user and didn't result in the user invoking the 'Ask Sender' option which means that the user was satisfied with the automatically generated data. This tag is distinguished from the actual received message since it contains a limited amount of information, placed in a unique position with respect to the message that it relates to, and can further be distinguished by the use of different fonts, border encompassing the additional data, etc. For example, a word such as 'quaranteen' that was previously determined to be 'quarantine' based on the context of the conversation which was determined from the data received in response to the inquiry (for example, both users were talking about a virus). If such prediction was presented to the recipient and accepted, then the word 'quarantine' appears above the text message that includes the word quarantine. This is accomplished by parsing the message and determining that the term 'quaranteen' is the only word in the sentence that appears to be ambiguous or misspelled. In some embodiments, parsing the portion of the text-based message further comprises extracting tokens from the text-based message (for example, splitting the string/sentence into a list of words or alphanumeric characters to extract tokens from the string). Parsing the portion of the text-based message further comprises performing syntactic analysis on the tokens (for example, to check whether a word belongs to a particular language's grammar) and performing semantic analysis on the tokens (for example, defining a word). Many programming languages provide functions to convert a string into a list; for example, an input of "we are champions" outputs ['we', 'are', 'champions']. As is discussed below in more detail, a dictionary service can also parse messages preceding the ambiguous word to check the strength of its prediction (prediction_score). For example, the dictionary service can check if any word in the previous messages relates to the word 'quarantine' or a synonym of such word.

An ambiguous word that was defined for the user earlier (e.g., awry) can automatically be re-defined to the user if used in another text-based message 106 from the same sender or a different sender. For example, by auto-displaying the previously accepted definition above the text message for a predetermined amount of time if such settings are enabled in the application's setting menu. The above embodiments can also be applied to group chat on messaging apps or even group chat feature that's part of group watch (e.g., where multiple users are watching the same content together while being at different places). In such scenario, if the recipient invokes the "Ask Sender," only the sender that sent the message is notified to reply. There could be scenarios where other users can reply if the recipient doesn't explicitly specific who should reply. For example, in a group setting (more than two people are part of the group), two options can be presented "Ask Sender," and "Ask" wherein "Ask" enables any of the other participants to comment. This can be done if the user is not satisfied with the answers given by the other services described above.

Figure 7:
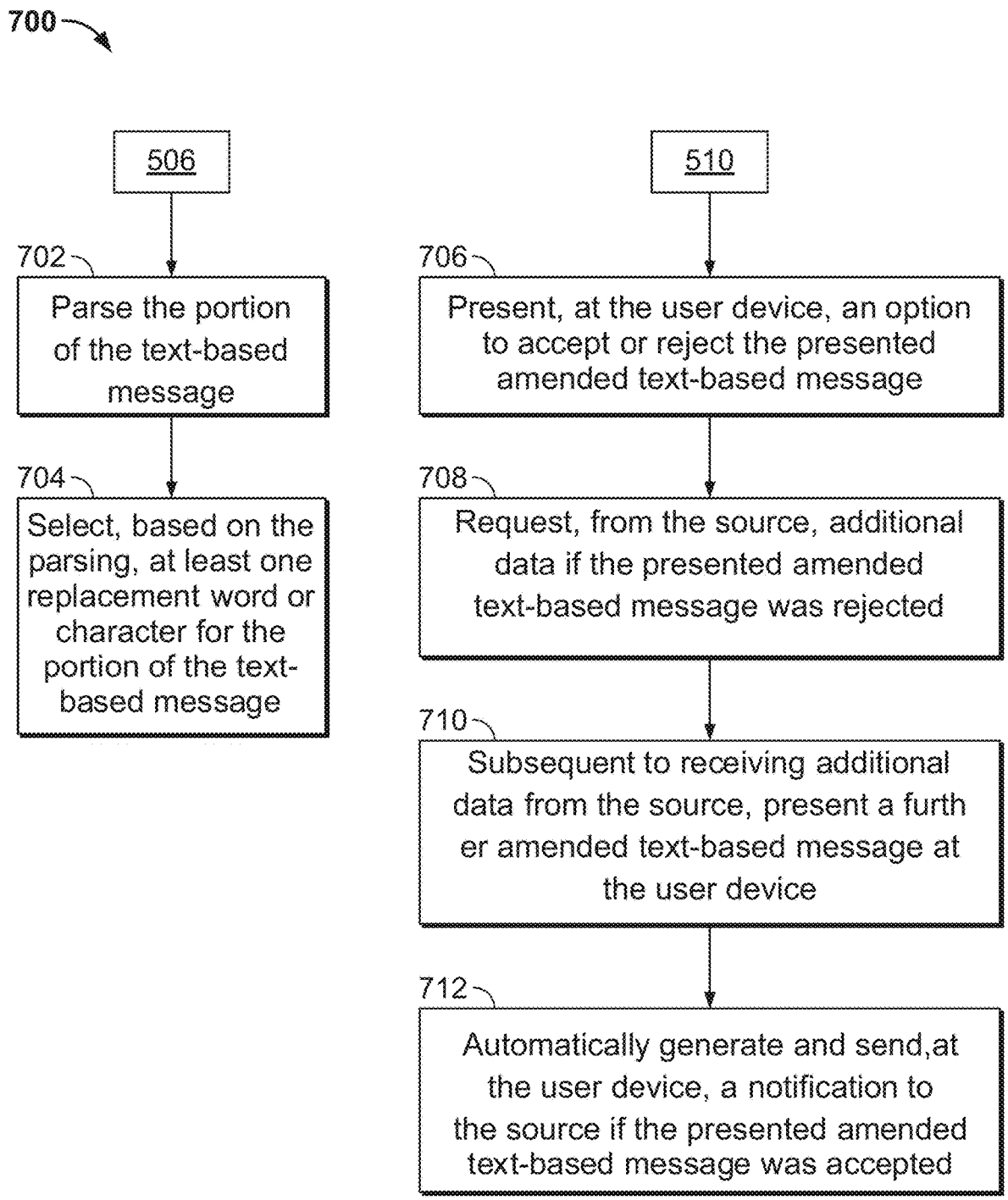
FIG. 7 shows yet another flowchart of illustrative steps involved in amending sent text-based messages, in accordance with some embodiments of the disclosure.

FIG. 7 is a flowchart 700 of illustrative steps involved in amending sent text-based messages which builds on from the features presented in FIG. 5 above, in accordance with the arrangement described above with reference to FIGS. 1 to 6. More particularly, FIG. 7 provides more detail on additional steps 506, and 510 as referred to above in FIG. 5.

At step 702, requesting, from a network (for example, the communications network which is in communication with a plurality of servers and with a plurality of other user device), data based on the inquiry of the portion of the text-based message can further comprise parsing the portion 108 of the text-based message 106. In some embodiments, parsing the portion of the text-based message further comprises extracting tokens from the text-based message (for example, splitting the string/sentence to extract tokens from the string). Parsing the portion of the text-based message further comprises performing syntactic analysis on the tokens (for example, to check whether a word belongs to a particular language's grammar) and performing semantic analysis on the tokens (for example, defining a word).

For example, the text-based message can be parsed through a programming language comprising functions to convert a string into a list. For example, an input of "we are champions" outputs ['we', 'are', 'champions']. Subsequently, existing libraries and tools (for example, stored on the user device, another user device and or on servers in communication with the communications network as described above) can be used to perform statistical natural language processing to detect and correct misspellings and/ or to get synonyms. In some embodiments, the existing libraries and tools can include a visual and/or textual based autocorrection program, a dictionary program, a thesaurus program, a translation program, or a combination of the above.

At step 704, based on the parsing, at least one replacement word 110 or character 110 for the portion 108 of the text-based message can be selected. For example, in the sentence "this whole thing felt wonky," the term 'wonky' might mean 'crooked' or even strange in this context. The recipient might not have heard this term before and might make a general request to inquire. Only if the other services associated with the messaging application cannot fulfill the user's request (for example, messaging app has access to local or online dictionary services, translating services, misspelling services, etc.), the sender is notified (for example, by displaying a question mark) over the specific message. This is different from message effects and the animation feature that are available within current messaging apps (for example, iMessage on iPhones) because the notification is not user-initiated in some cases (for example, the sender is automatically queried if a definition was not found as discussed in more detail above and below). When the sender is notified, he or she is prompted to take an action, such as edit or add additional information. Before the messaging app asks the sender for additional information, the messaging app might present a synonym for the term 'wonky'—since that might explain the meaning of this text messages to the recipient. Similarly, the text "I have to quaranteen" is a misspelling of the term 'quarantine'—especially if the preceding messages were discussing a virus such as Covid-19.

At step 706, presenting the amended text-based message 110 at the user device 100 (for example, on the user interface 102) may further comprise presenting, at the user device 100, an option to accept or reject the presented amended text-based message 110. In response to the user issuing a request for more clarification, such as hard pressing the text or portion of it, the messaging app can attempt to resolve the inquiry by suggesting the term 'quarantine' as a meaning to 'quaranteen'. Again, the sender can be notified if the recipient rejects the explanation, by selecting a prompt such as "Ask Sender." Similar techniques can be applied to the detection of word that are syntactically different by being, for example, in a different language to the user device's primary language/region such as 'he gave her a carte blanche' meaning 'I can do as I wish.' Accordingly, at step 708, the computer-implemented method may further request, from the source (for example, the sender of the text-based message), additional data if the presented amended text-based message was rejected. At step 710, the computer-implemented method may, subsequent to receiving additional data from the source (for example, the sender of the text-based message), present a further amended text-based message at the user device 100. Optionally, at step 712, the computer-implemented method may further automatically generate and send, at the user device 100, a notification to the source (for example, the sender of the text-based message) if the presented amended text-based message 110 was accepted.

In one embodiment, the data that was presented to the recipient can also be shown to the sender. This allows the sender to correct the data from these services. In such case, the correction is also reflected in the recipient's chat window and replaces the data that was generated before.

Figure 8:
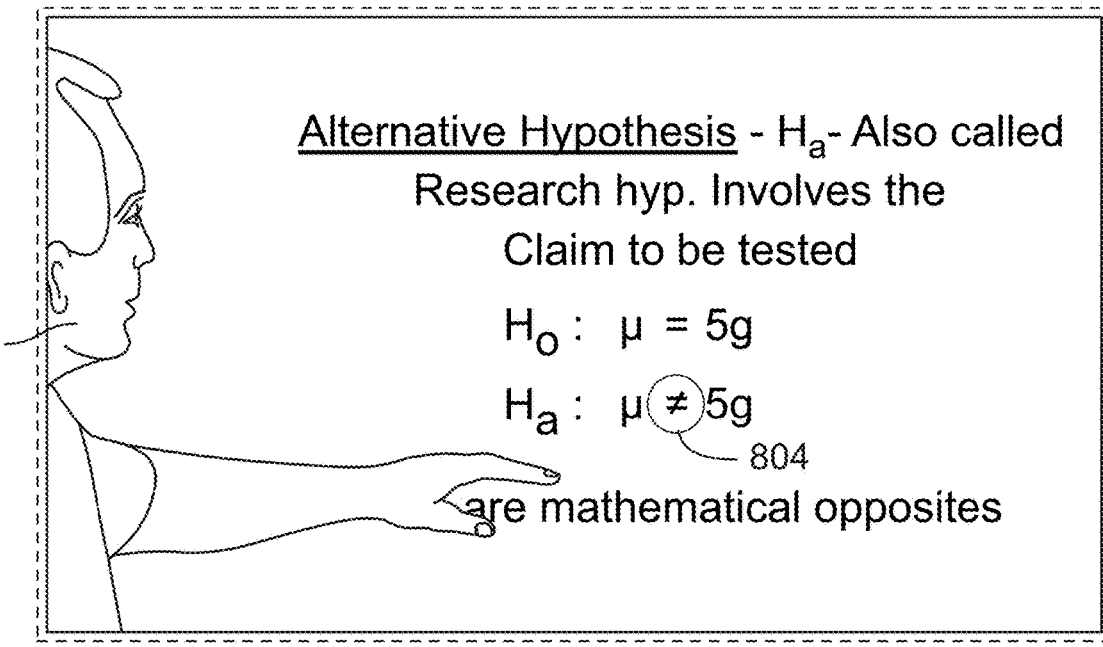
FIG. 8 shows illustrations of a user interface for amending image-based messages, in accordance with some embodiments of the disclosure.

FIG. 8 illustrates systems and methods for amending image-based messages, in accordance with the arrangement described above with reference to FIGS. 1 to 7. As mentioned above with reference to FIG. 2, one of the user devices 204, 206 within the network 200 as mentioned can be a host of a group of a plurality of user devices 204, 206. This host can, optionally, be the only user device 204, 206 comprising permission to send text-based messages 106. This can be particularly useful in an online classroom with a tutor having the sole permission to broadcast a (live or pre-recorded) video 106 of the classroom content. In particular, this can provide immediate feedback to the tutor of a classroom about a mistake in the content (wherein the content is substantially similar to the text-based message 106 described above). This immediate feedback mechanism can help trigger classroom discussions between the tutor and students helping resolve questions in students' minds and helping accidental correct errors in the presentation.

In the systems and methods of FIG. 8, a live or prerecorded video 802 can be played back to a user of a user device 100, 204, 206 as described above. Tutors can use any one of the following to explain the topics of the subject: virtual whiteboards, camera/recorder along with physical whiteboards, blackboards and/or sheets of paper, pre-typed set of slides shared via video conferencing systems such as Zoom, pre-typed set of slides projected on the screen by a projector and filmed using a camera. If the user detects an error or wants to bring attention to a certain feature of the video, the user can input a request (for example as described above with reference to FIG. 5) into the user interface 102, 802 of their user device 100 (for example, by using a virtual pen to draw a circle around feature 804).

In some embodiments, the user's request 804 can correct one or more mistakes in the image resulting in a corrected image 806 and a visible correction 808. Using this, the students have the ability to write over the perceived mistake 804 with what they think is correct. The system employs handwriting recognition/NLP using NLP/handwriting recognition to detect what each student is writing. If a threshold number of students make the same correction, then the system generates an alert to the tutor. If it is a live session, then the tutor is alerted by the system immediately and the system presents the tutor with the correction 808 (as discussed with reference to FIG. 5 above). The tutor has the option of accepting the correction 808 live in front of the students to clear the confusion. If the corrections offered by the students are wrong, the tutor has the option of rejecting the correction (as discussed above with reference to FIG. 7 above) and can, instead, go over the concept one more time. If the session is a pre-recorded session and is played back later, then the system can generate the alert to the tutor offline—The tutor can correct the mistake in the recording and redistribute the recording and/or add additional segments to the recording to further explain the concept.

In some embodiments, the user's request can mark a mistake 804 in the image 802. This is similar to correcting a mistake part above. However, the students may just circle what they think is a mistake 804. They may not be able to correct it since they may not know the correction. Here too, the system waits for a threshold number of such markings and then alerts the tutor. The tutor is pointed to the place where there may be a mistake. This will give them a chance to review and correct if necessary.

In some embodiments, the students can mark an entire segment as containing a single or multiple mistakes or generally non-understandable. The system starts recording this action from the first student. If the number of students marking single or multiple mistakes reaches a predetermined threshold, the system can raise an alert and alert the tutor, as described above. If teaching is via slides plus video conference system, then the markings or corrections made by students will appear as annotations on the tutor's screen. If teaching is via slides plus projection on screen or physical white/blackboards, then the markings or corrections are made and projected on the screen/boards. If teaching is via virtual whiteboarding, then the markings or corrections appear as annotations on the virtual whiteboard.

When the tutor engages with the students for several hours explaining topics, it is very common for them to make mistakes/typos while teaching. The mistakes could range from a simple spelling error to larger mistakes like misstating the name of a concept. Mistakes could also include incorrect flow-charting or drawings that have the capability to strongly confuse students. In a virtual setting where the medium of feedback is less convenient than a physical classroom setting these mistakes are more likely to be caught when employing these systems and methods. For example, confidence among students that a mistake is indeed a mistake is given, for example, by recording and displaying other students' corrections, and by providing quick and easy corrections without interrupting the whole class.

In some embodiments, when a threshold number of students who either mark or correct mistakes is reached, the students who have participated in the markings are alerted that others feel the same way. This gives confidence to the students to use traditional mechanisms (like unmute and speak in a videoconference) to interrupt the tutor and discuss the mistake further. In some embodiments, the system alerts the tutor when a threshold number of students marking/correcting is reached. The system can also employ other variations of thresholds, such as integrating with the class grades of the students. If a student is particularly bright and performing well in the class, then their markings/corrections can be given a higher weightage score. The scores of all students are totaled to a final score. If this final score is higher than a threshold score, then the system alerts the tutor.

In some embodiments, the system can also provide a higher weightage to markings from those students how have marked accurately in the past. This will also mean if a student makes an incorrect marking several times, then weightage for that student will go down in time. In some embodiments, different scores are given to students based on their actions. For example, a higher score may be given to a student who corrects a mistake, a medium score may be given to a student who marks a mistake, and a lower score may be given to a student who marks a segment. A student may be given a higher, medium or lower score for any of the above-mentioned actions. In some embodiments, students are, by default, anonymous while making these markings. However, they may choose not to be. The system may provide a higher score to the marking that's made by a student who is not anonymous (assumption, that student is very confident of the mistake).

The processes described above are intended to be illustrative and not limiting. One skilled in the art would appreciate that the steps of the processes discussed herein may be omitted, modified, combined, and/or rearranged, and any additional steps may be performed without departing from the scope of the disclosure. More generally, the above disclosure is meant to be example and not limiting. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

What is claimed is:

1. A computer-implemented method comprising:
    obtaining, from a source, a text-based message;
    receiving, at a user device, an inquiry of a portion of the text-based message;
    requesting, from a database associated with a network, data based at least in part on previous inquiries of portions of text-based messages that are related to the inquiry of the portion of the text-based message;
    amending at least the portion of the text-based message based at least in part on the data; and
    presenting the amended portion of the text-based message at the user device.

2. The computer-implemented method of claim 1, further comprising presenting a notification that the text-based message was amended, wherein the notification comprises any one of:
    presenting at least the portion of the amended text-based message in a different visual format to the text-based message;
    presenting at least the portion of the amended text-based message in addition to the text-based message; and playing back an audio recording of at least the portion of the amended text-based message.

3. The computer-implemented method of claim 1, wherein the inquiry of the portion of the text-based message comprises any one of
    a misspelling of at least one word;
    a correct spelling of the at least one word, wherein the meaning of the at least one word is not known to a user of the user device; and
    a set of words comprising the at least one word that is syntactically different to the remaining words of the set of words.

4. The computer-implemented method of claim 1, wherein requesting, from the network, the data based at least in part on the inquiry of the portion of the text-based message further comprises:
    parsing the portion of the text-based message through any one of:
        a visual and/or textual based autocorrection program,
        a dictionary program,
        a thesaurus program, and
        a translation program; and
    selecting, based at least in part on the parsing, at least one replacement word or character for the portion of the text-based message.

5. The computer-implemented method of claim 4, wherein parsing the portion of the text-based message further comprises:
    extracting tokens from the text-based message;
    performing syntactic analysis on the tokens; and
    performing semantic analysis on the tokens.

6. The computer-implemented method of claim 1, wherein presenting the amended text-based message at the user device further comprises:
    presenting, at the user device, an option to accept or reject the presented amended text-based message;
    requesting, from the source, additional data if the presented amended text-based message was rejected; and
    subsequent to receiving additional data from the source, presenting a further amended text-based message at the user device, wherein the source is a sender of the text-based message.

7. The computer-implemented method of claim 6, further comprising:
    automatically generating and sending, at the user device, a notification to the source if the presented amended text-based message was accepted.

8. The computer-implemented method of claim 1, further comprising:
    providing, at the user device, a visual notification that the data related to at least the portion of the text-based message is available;
    providing, at the user device, an option to select the visual notification; and
    subsequent to receiving a selection at the user device, presenting at least some of the data based at least in part on the portion of the text-based message at the user device.

9. The computer-implemented method of claim 1, further comprising:
    storing the amended portion of the text-based message;
    receiving at least one further text-based message, the at least one further text-based message comprising the same portion; and
    automatically amending the portion of the at least one further text-based message based at least in part on the stored amended portion of the text-based message.

10. The computer-implemented method of claim 1, wherein at least a portion of the text-based message comprises any one of:
    a word;
    an alphanumeric character;
    a special character;
    an image; or
    any combination of the above.

11. A system comprising:
    a memory storing instructions;
    communication paths; and
    a control circuitry coupled to the communication paths and the memory, wherein the control circuitry is configured to execute the instructions to:
        obtain, from a source, a text-based message;
        receive, at a user device, an inquiry of a portion of the text-based message;
        request, from a database associated with a network, data based at least in part on previous inquiries of portions of text-based messages that are related to the inquiry of the portion of the text-based message;
        amend at least the portion of the text-based message based at least in part on the data; and
        present the amended portion of the text-based message at the user device.

12. The system of claim 11, wherein the control circuitry is further configured to present a notification that the text-based message was amended, wherein the notification comprises any one of:
    presenting at least the portion of the amended text-based message in a different visual format to the text-based message;
    presenting at least the portion of the amended text-based message in addition to the text-based message; and
    playing back an audio recording of at least the portion of the amended text-based message.

13. The system of claim 11, wherein the inquiry of the portion of the text-based message comprises any one of:
    a misspelling of at least one word;
    a correct spelling of the at least one word, wherein the meaning of the word is not known to a user of the user device; and
    a set of words comprising the at least one word that is syntactically different to the remaining words of the set of words.

14. The system of claim 11, wherein the control circuitry is configured to request, from the network, the data based at least in part on the inquiry of the portion of the text-based message by executing the instructions to:
    parse the portion of the text-based message through any one of:
        a visual and/or textual based autocorrection program,
        a dictionary program,
        a thesaurus program, and
        a translation program; and
    select, based at least in part on the parsing, at least one replacement word or character for the portion of the text-based message.

15. The system of claim 14, wherein the control circuitry configured to parse the portion of the text-based message by executing the instructions to:
    extract tokens from the text-based message;
    perform syntactic analysis on the tokens; and
    perform semantic analysis on the tokens.

16. The system of claim 11, wherein the control circuitry is configured to present the amended text-based message at the user device by executing the instructions to:

present, at the user device, an option to accept or reject the presented amended text-based message;

request, from a sender of the text-based message, additional data if the presented amended text-based message was rejected; and subsequent to receiving additional data from the sender of the text-based message, present a further amended text-based message at the user device.

17. The system of claim 16, wherein the control circuitry is further configured to execute the instructions to:

automatically generate and send, at the user device, a notification to the source if the presented amended text-based message was accepted.

18. The system of claim 11, wherein the control circuitry is further configured to execute the instructions to:

provide, at the user device, a visual notification that the data related to at least the portion of the text-based message is available;

provide, at the user device, an option to select the visual notification; and subsequent to receiving a selection at the user device, present at least some of the data based at least in part on the portion of the text-based message at the user device.

19. The system of claim 11, wherein the control circuitry is further configured to execute the instructions to:

store the amended portion of the text-based message;

receive at least one further text-based message, the at least one further text-based message comprising the same portion; and automatically amend the portion of the at least one further text-based message based at least in part on the stored amended portion of the text-based message.

20. The system of claim 11, wherein at least a portion of the text-based message comprises any one of:

a word;

an alphanumeric character;

a special character;

an image; or any combination of the above.

* * * * *